United States Patent
Mayak

(10) Patent No.: US 6,192,116 B1
(45) Date of Patent: *Feb. 20, 2001

(54) SYSTEM AND METHOD FOR GENERATING CID/CIDCW INFORMATION WITH A USER INPUTTED MESSAGE

(75) Inventor: Barbara Mayak, Whitehall, PA (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/144,327

(22) Filed: Aug. 31, 1998

(51) Int. Cl.$^7$ ........................................ H04M 1/56
(52) U.S. Cl. ..................... 379/142; 379/93.23; 379/201; 379/211
(58) Field of Search .................. 379/142, 93.17, 379/93.23, 127, 210, 215

(56) References Cited

U.S. PATENT DOCUMENTS

| | | | | |
|---|---|---|---|---|
| 5,343,516 | * | 8/1994 | Callele et al. | 379/142 |
| 5,377,260 | * | 12/1994 | Long | 379/142 |
| 5,745,557 | * | 4/1998 | Anglikowski | 379/177 |
| 5,764,901 | * | 6/1998 | Skarbo et al. | 395/200.34 |
| 5,784,444 | * | 7/1998 | Snyder et al. | 379/142 |
| 5,894,504 | * | 4/1999 | Alfred et al. | 379/88.13 |
| 5,907,596 | * | 5/1999 | Karnowski | 379/88.21 |
| 5,933,778 | * | 8/1999 | Buhrmann et al. | 455/461 |

* cited by examiner

Primary Examiner—Curtis A. Kuntz
Assistant Examiner—Binh K. Tieu

(57) ABSTRACT

A system and method for generating caller ID or caller ID-call waiting (CID or CIDCW) information with a user inputted message. In the present system and method, a central office receives a user inputted message and a destination number from a caller's phone, attaches the user inputted message to either the CID or CIDCW information of the caller to produce a destination message, and transmits the destination message to a display of a phone corresponding to the destination number. In this way, the caller's specially inputted message is displayed with the CID/CIDCW information on a display of the call receiving party.

22 Claims, 4 Drawing Sheets

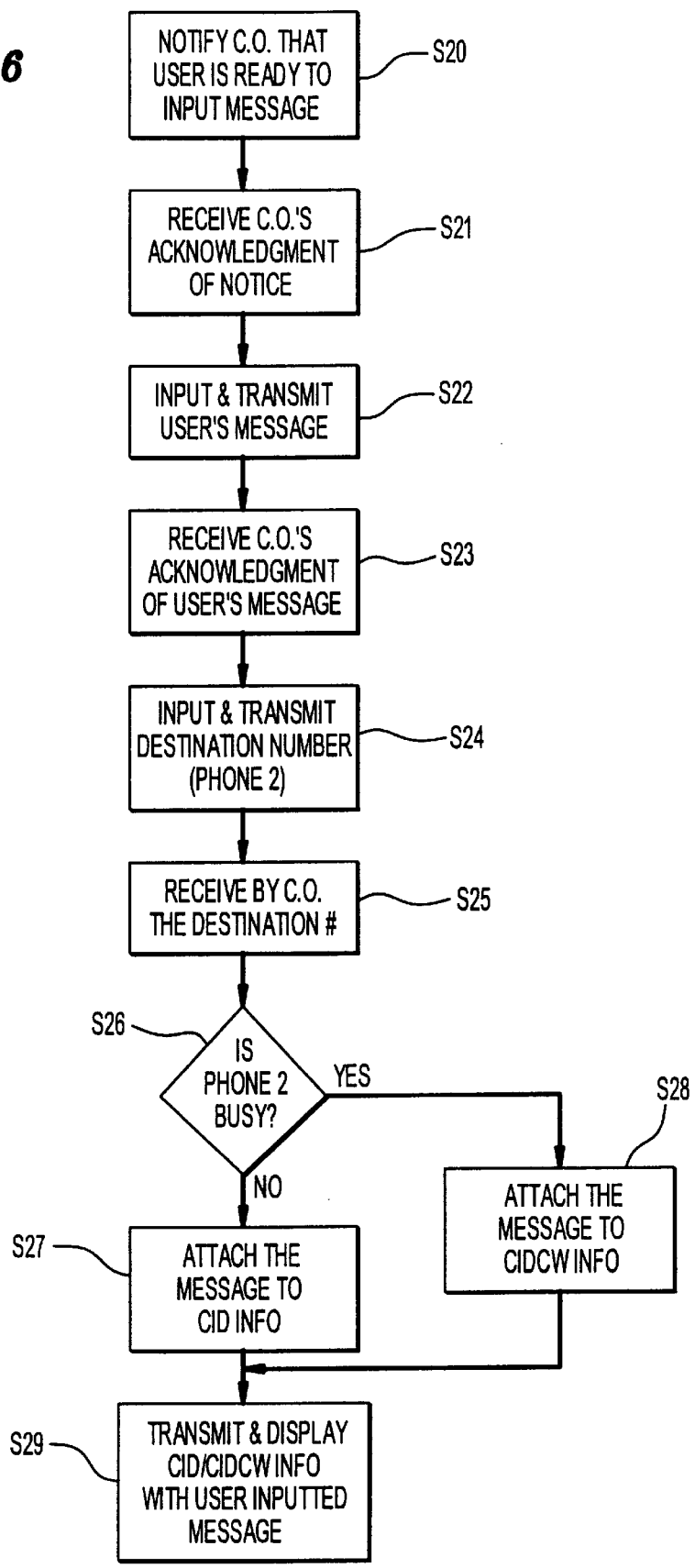

SYSTEM AND METHOD FOR GENERATING CID/CIDCW INFORMATION WITH A USER INPUTTED MESSAGE

BACKGROUND OF THE INVENTION

1. Field of the Invention

The present invention relates to a system and method for generating caller ID/caller ID-call waiting (CID/CIDCW) information with a user inputted alphanumeric message.

2. Description of Related Art

CID and CIDCW features are widely used by businesses and residents. Generally, a customer obtains a CID or CIDCW service from his or her phone company. The phone company has a central office that performs switching operations for the customer's phone. With the CID service, whenever a call is placed to the customer's phone, the caller's directory information is automatically displayed on the display attached to or incorporated into the customer's phone. The caller's directory information, i.e., CID information, includes the caller's name and/or phone number. With the CIDCW service, whenever a call is placed to the customer's phone while the customer's phone is being used, a signal, indicating a call waiting, and the CID information are displayed on the customer's phone. The central office provides the CID and CIDCW services in addition to the phone switching operations.

Based on the displayed CID/CIDCW information, a call receiving party can determine whether or not to respond immediately to the in-coming call. If the call receiving party is unable to respond to the in-coming call immediately, the call receiving party has the CID information to return a call at any time thereafter. Often, however, the customer is unable to quickly recognize the caller based on the CID information displayed on his display. Especially in emergencies, the caller places a call using a pay phone or a stranger's phone. In these cases, the call receiving party is unable to make an informed decision as to whether or not to pick up the call or the call waiting. Therefore, the CID and CIDCW features become less effective and less useful when the call receiving party cannot readily recognize the caller based on the CID/CIDCW information being displayed.

SUMMARY OF THE INVENTION

The present invention is directed to a system and method for generating caller ID/caller ID-call waiting (CID/CIDCW) information with a user inputted message. In the present system and method, a central office receives a user inputted message and a destination number from a caller's phone, attaches the user inputted message to either the CID or CIDCW information of the caller to produce a destination message, and transmits the destination message to a display of a phone corresponding to the destination number. In this way, both the caller's specially inputted message and the CID/CIDCW information are displayed on the display of a call receiving party.

BRIEF DESCRIPTION OF THE DRAWINGS

The present invention will become more fully understood from the detailed description given hereinbelow and the accompanying drawings which are given by way of illustration only, wherein reference numerals designate corresponding parts in the various drawings and wherein:

FIG. 6 shows a flowchart illustrating a method of generating CID/CIDCW information with a user inputted message in accordance with another embodiment of the present invention.

DETAILED DESCRIPTION OF THE PREFERRED EMBODIMENTS

The following detailed description relates to a system and method for generating CID/CIDCW information with a user inputted alphanumeric message according to the present invention. In the present system and method, a user (caller) inputted alphanumeric message is appended to the CID or CIDCW information so that a call receiving party can view the CID/CIDCW information with the caller's special alphanumeric message.

Figure 1:
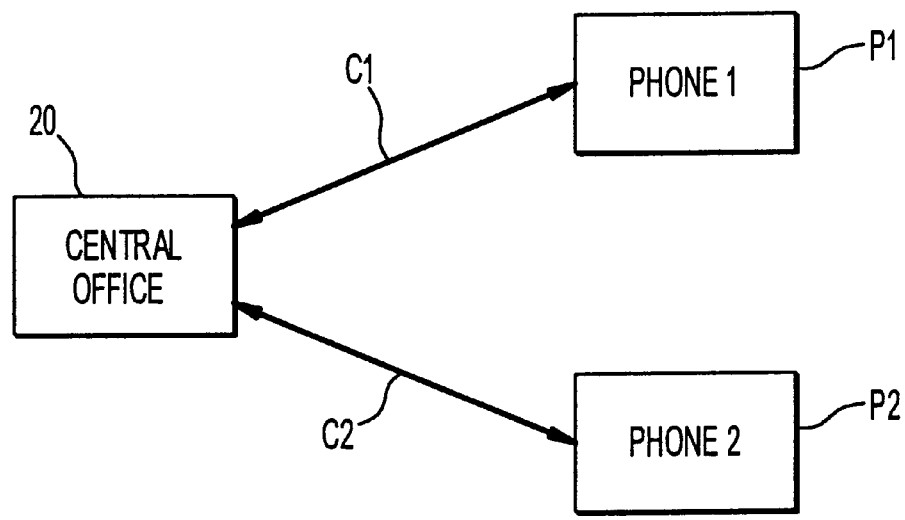
FIG. 1 shows a schematic diagram of a system for generating CID/CIDCW information with user inputted messages in accordance with an embodiment of the present invention.

FIG. 1 shows an example of a block diagram of a system for generating CID/CIDCW information with a user inputted alphanumeric message according to an embodiment of the present invention. As shown therein, the system includes a plurality of phones P1 and P2, a Central Office 20, and a plurality of connections C1 and C2 for connecting the phones P1 and P2 with the Central Office 20.

Figure 2:
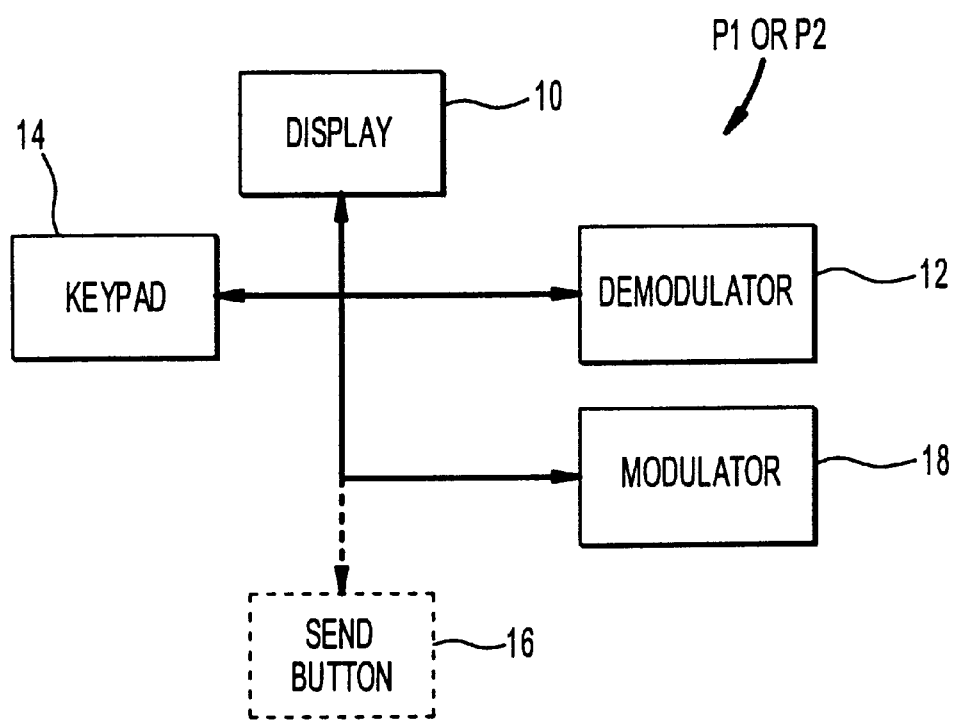
FIG. 2 shows an example of elements of a phone used in the system shown in FIG. 1.

The phones P1 and P2 are phones that are known in the art for receiving and displaying CID and CIDCW information from the Central Office 20. Such phones include, as shown in FIG. 2, a display 10 either built in or attached to the phone, a demodulator 12 for demodulating a CID/CIDCW information signal for a display, and a keypad 14. The phones P1 and P2 further include a modulator 18, and optionally a SEND button 16. The modulator 18 may be either built in or attached to the phone, and is preferably a FSK (Frequency Shift Keying) modulator.

The first phone P1 receives an alphanumeric message inputted by the user through the keypad 14 of the phone P1. This message is displayed on the display 10 of the phone P1 for a user's verification, and modulated by the modulator 18 of the phone P1. The user also inputs a destination number (i.e., the call receiving party's phone number, e.g. phone P2 number) through the keypad 14 of the phone P1. The destination number represented in DTMF (Dual Tone Modulated Frequency) tone, and the modulated user's message are transmitted from the phone P1 to the Central Office 20 through the connection C1. The user inputted message and the destination number can be transmitted at one time by pressing the SEND button 16 on the first phone P1.

The Central Office 20 receives the user inputted message and the destination number (phone P2 number) from the first phone P1. The Central Office 20 determines whether or not the phone P2 is currently being used to send either the CID or CIDCW information to the phone P2 through the connection C2. The Central Office 20 then attaches the user inputted message to the CID/CIDCW information signal automatically generated based on the phone P2 number. After a predetermined number of rings or after a handshaking process, the Central Office 20 transmits to the phone P2 the CID/CIDCW information with the user inputted message attached thereto.

The second phone P2 receives and demodulates the signal transmitted from the Central Office 20 using the demodulator 12. Then the CID/CIDCW information with the user inputted alphanumeric message are displayed on the display 10 of the second phone P2. Here, although the call receiving party's phone number and the caller's alphanumeric message are inputted to the first phone P1 through the keypad 14 of the phone P1, other input units may be used in lieu of the keypad 14 of the first phone P1. Further, the CID/CIDCW information with user inputted alphanumeric messages can be sent from the second phone P2 to the first phone P1 through the Central Office 20.

Figure 3:
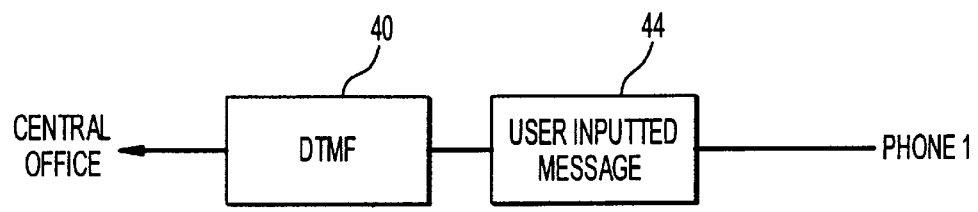
FIG. 3 shows an example of a signal generated from a phone P1 to a central office shown in FIG. 1 in accordance with the embodiment of the present invention.

FIG. 3 shows an example of a signal transmitted from the first phone P1 to the Central Office 20 through the connection C1 according to the embodiment of the present invention. As shown therein, the signal includes DTMF tones 40 and a user inputted message 44. The DTMF tones 40 correspond to the destination number inputted by the user through the keypad 14 of the first phone P1. The user inputted message 44 represents the modulated user inputted alphanumeric message to be sent to the destination number (receiver's phone number).

Figure 4A:
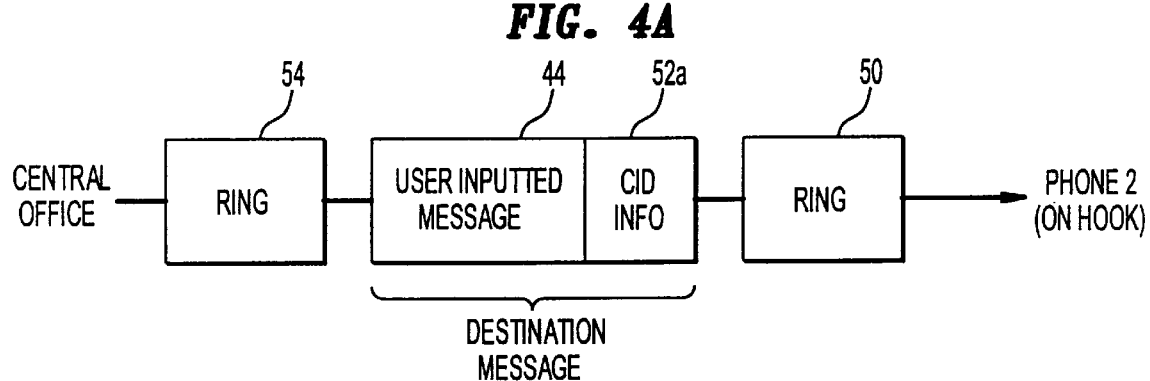
FIG. 4A shows an example of a signal generated from the central office to a phone P2 (on hook) of FIG. 1 in accordance with the embodiment of the present invention.

FIG. 4A shows an example of a signal transmitted from the Central Office 20 to the second phone P2 through the connection C2 according to the embodiment of the present invention, when the second phone P2 is not currently in use (on hook). As shown therein, the signal includes a ring 50, a CID information signal 52a, the user inputted message 44 attached to the information signal 52a, and another ring 54. The user inputted message 44 attached to the information signal 52a forms a destination message. The rings 50 and 54 are rings generated when a call is placed, and are known in the art. Although it is shown that the destination message is transmitted between the rings 50 and 54, the destination message may be transmitted in other sequences.

Figure 4B:
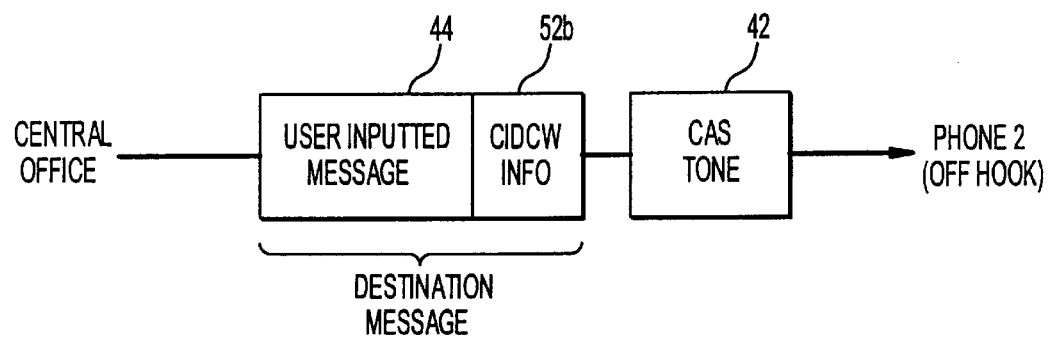
FIG. 4B shows an example of a signal generated from the central office to a phone P2 (off hook) of FIG. 1 in accordance with the embodiment of the present invention.

FIG. 4B shows an example of a signal transmitted from the Central Office 20 to the second phone P2 through the connection C2 according to the embodiment of the present invention, when the second phone P2 is currently in use (off hook). As shown therein, the signal includes a CAS tone 42, a CIDCW information signal 52b, and the user inputted message 44 attached to the information signal 52b. The user inputted message 44 attached to the information signal 52b forms a destination message. The CAS tone 42 is a mark tone conventionally used in transmitting CIDCW information.

The CID information signal 52a carries the CID information of the caller (Phone P1), the CIDCW information signal 52b carries the CIDCW information, and the user inputted message 44 represents any alphanumeric message inputted by the caller. It is preferred that the destination message of FIGS. 4A and 4B has the size of less than or equal to 255 bytes, or is transmitted in less than or equal to about 4 seconds. This ensures that the user inputted message 44 is safely transmitted to the destination number under the CID/CIDCW standards known in the art. FIGS. 3, 4A, and 4B merely show examples of signals transmitted in the present system, and other variations in the format of these signals are considered a part of the present invention.

Figure 5:
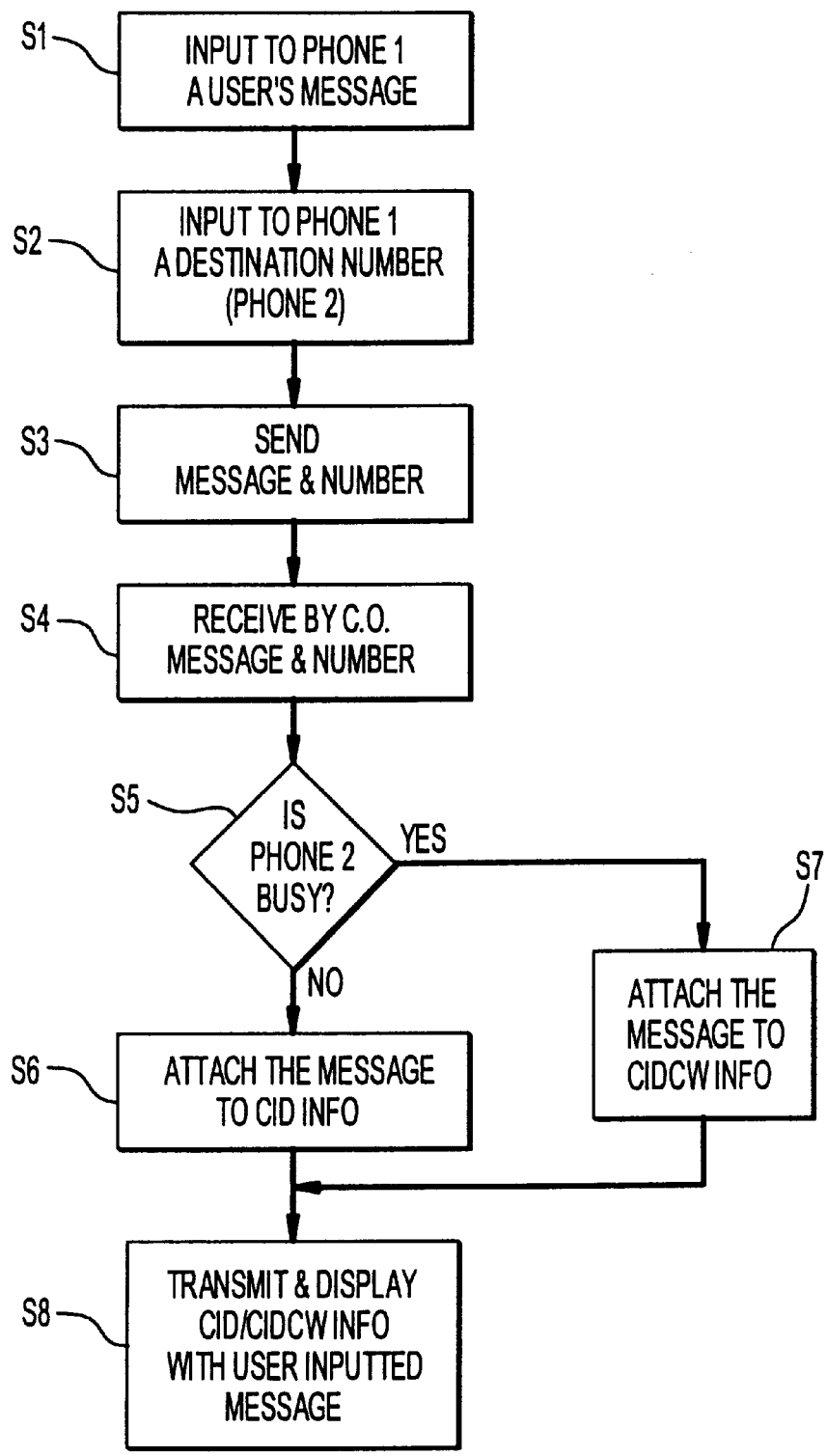
FIG. 5 shows a flowchart illustrating a method of generating CID/CIDCW information with a user inputted message in accordance with an embodiment of the present invention.

A method of generating CID/CIDCW information with a user inputted message in accordance with an embodiment of the present invention will be described below referring to FIG. 5.

As shown therein, in Step S1, the user (caller) inputs his or her alphanumeric message into the phone P1 via the key pad 12 of the phone P1. For example, each alphabet and number can be inputted by pressing a key or a combination of keys on the key pad 12 designated to correspond to an alphabet or a number. The designation of the keys on the keypad 14 to represent alphabets and numbers is preset by the Central Office 20 when the present system is activated. As the user's message is inputted to the phone P1, the inputted message is modulated by the modulator 18 of the phone P1 for a transmission.

In Step S2, the user inputs the destination number via the key pad 12 of the phone P1. In this example, the destination number represents the phone number of the phone P2, but can be any phone number that the user wishes to call. The destination number is converted into DTMF tone according to a known process. In Step S3, the user sends the modulated user inputted message and the destination number to the Central Office 20 by pressing the SEND button 16 on the phone P1, or by pressing certain keys on the keypad 14 of the phone P1.

In Step S4, the Central Office 20 receives a signal representing the modulated user's message and the destination number from the phone P1, and determines whether or not the destination party's phone 132 is currently being used, in Step S5. If the destination party's phone P2 is not currently being used, the Central Office 20 prepares the CID information of the caller (user) according to known CID processes, and attaches the user inputted message to the CID information, in Step S6. If the destination party's phone P2 is currently being used, the Central Office 20 prepares the CIDCW information of the caller (user) according to known CIDCW processes, and attaches the user inputted message to the CIDCW information, in Step S7, to generate a destination message as shown in, e.g., FIG. 4. Once the destination message is generated, the Central Office 20 transmits it to the destination party's phone P2 through the connection C2, in Step S8. The destination message can be transmitted between the first two rings, after a predetermined number of rings, or in other sequences, if the destination party's phone P2 is not currently in use. If the destination party's phone P2 is currently in use (i.e., the CIDCW information is attached to the user inputted message), the Central Office carries out a known handshaking process and generates a CAS tone as shown in FIG. 4B. The CAS is generated according to a known CIDCW process for muting DTMF tones. The transmitted destination message is displayed on the display 10 of the phone P2, in Step S8.

A method of generating CID/CIDCW information with a user inputted message in accordance with another embodiment of the present invention will be described below referring to FIG. 6.

As shown therein, in Step S20, the user (caller) sends a notification signal to the Central Office 20 by pressing a key or a combination of keys on the keypad 14 of the phone P1. The notification signal indicates that the user is ready to input the user's alphanumeric message. In Step S21, the Central office 20 receives the notification signal, and sends a first acknowledgement signal to the phone P1 for acknowledging the receipt of the notification signal. The first acknowledgement signal carries a predetermined tone, a sequence of tones, or a recorded voice message. Then in Step S22, the user inputs his or her alphanumeric message into the phone P1 via the keypad 14 of the phone P1 as described above. At the end of the user's message, the user can press a key or a combination of keys to indicate the end of the message. The inputted message is modulated by the modulator 18 and transmitted to the Central Office 20 through the connection C1. In Step S23, the Central Office 20 transmits a second acknowledgment signal to the phone P1 for acknowledging the receipt of the user inputted message.

In Step S24, once the user receives the second acknowledgment signal from the Central Office 20, the user inputs a destination number via the key pad 12 of the phone P1, and transmits it in DTMF tone to the Central Office 20 via the connection C1. In this example, the destination number represents the phone number of the phone P2, but can be any phone number that the user wishes to call. In Step S25, the Central Office 20 receives the destination number in DTMF tone. In Step S26, based on the destination number, the Central Office 20 determines whether the destination party's phone P2 is currently being used. If the destination party's phone P2 is not currently being used, the Central Office 20 prepares the CID information of the caller (user), and attaches the user inputted message to the CID information, in Step S27. If the destination party's phone P2 is currently being used, the Central Office 20 prepares the CIDCW information of the caller, and attaches it to the CIDCW information, in Step S28. Once the destination message composed of the user inputted message and the CID/CIDCW information (as shown in FIG. 4) is formed, the Central Office 20 transmits the destination message to the destination party's phone P2, in Step S29. The destination message can be transmitted between the first two rings, after a predetermined number of rings, or in other sequences, if the destination party's phone P2 is not currently in use. If the destination party's phone P2 is currently in use (i.e., the CIDCW information is attached to the user inputted message), the Central Office carries out a known handshaking process and generates a CAS tone as shown in FIG. 4B. The CAS is generated according to a known CIDCW process for muting DTMF tones. The transmitted destination message is displayed on the display 10 of the phone P2, in Step S29.

According to the present system and method, a call receiving party can view the CID/CIDCW information with the caller's personal message, and make a better informed decision as to whether to answer the in-coming call or call waiting. The displayed message can be stored in a memory for further retrieval. The present system and method employ the CID/CIDCW services known in the art to produce and display CID/CIDCW information with a user inputted alphanumeric message attached thereto, and can process both digital and analog signals. Further, the present system and method can be implemented by a software program such that signals to be transmitted to a central office from a phone and signals to be transmitted to a phone from a central office are generated and formatted automatically based on the user's input.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for attaching a user inputted message to caller ID or caller ID-call waiting (CID or CIDCW) information, comprising the steps of:

receiving a notification signal from a first phone indicating a user inputted message will be sent;

sending an acknowledgment signal to the first phone in response to the notification signal;

receiving the user inputted message from the first phone;

receiving a destination number from the first phone;

attaching the user inputted message to either CID or CIDCW information associated with the first phone to produce a destination message; and sending the destination message to a second phone identified by the destination number.

2. The method of claim 1, wherein the destination number represents a phone number.

3. The method of claim 1, further including the steps of:

manually inputting a user's message through a keypad of the first phone;

modulating the user inputted message from said manually inputting step; and transmitting the modulated user inputted message and the destination number to a central office so that the central office receives the user inputted message and the destination number.

4. The method of claim 3, wherein said step of transmitting the modulated user inputted message includes:

pressing a send button on the first phone; and transmitting simultaneously the modulated user inputted message and the destination number to the central office when the send button is pressed.

5. The method of claim 3, wherein in said modulating step, the user inputted message is modulated using a frequency shift keying (FSK) modulator.

6. The method of claim 1, wherein the receiving a destination number step receives the destination number represented in Dual Tone Modulated Frequency (DTMF) tone.

7. The method of claim 1, further comprising the step of:

displaying the destination message on a display of the second phone.

8. The method of claim 1, wherein said attaching step further includes:

determining whether a second phone corresponding to the destination number is currently in use.

9. The method of claim 8, wherein said attaching step further includes:

attaching the user inputted message to the CIDCW information if the second phone is currently in use; and attaching the user inputted message to the CID information if the second phone is not currently in use.

10. The method of claim 1, wherein the CID information includes at least one of a name and a phone number corresponding to the first phone, and the CIDCW information includes a call waiting signal and at least one of the name and phone number corresponding to the first phone.

11. A system for attaching a user inputted message to caller ID or caller ID-call waiting (CID or CIDCW) information, comprising:

a central office for receiving a notification signal from a first phone indicating a user inputted message will be sent, sending an acknowledgment signal to the first phone in response to the notification signal, receiving the user inputted message from the first phone, receiving a destination number from the first phone, attaching the user inputted message to either CID or CIDCW information associated with the first phone to produce a destination message, and sending the destination message to a second phone identified by the destination number.

12. The system of claim 11, wherein the destination number represents a phone number.

13. The system of claim 11, further comprising:
the first phone for entering the user inputted message and the destination number.

14. The system of claim 11, wherein the first phone includes:
an input unit for inputting the user's message and the destination number; and
a modulator for modulating the user inputted message from the input unit for transmission.

15. The system of claim 14, wherein the modulator is a frequency shift keying (FSK) modulator.

16. The system of claim 11, wherein the first phone includes a button for simultaneously transmitting the user inputted message and the destination number to the central office when the button is pressed.

17. The system of claim 11, wherein the first phone transmits to the central office the destination number represented in Dual Tone Modulated Frequency (DTMF) tone.

18. The system of claim 11, wherein the destination number represents a phone number of a second phone.

19. The system of claim 18, wherein the second phone includes a display for displaying the destination message transmitted from the central office.

20. The system of claim 11, wherein when the central office receives the user inputted message and the destination number, the central office determines whether a second phone corresponding to the destination number is currently in use.

21. The system of claim 20, wherein the central office attaches the user inputted message to the CIDCW information if the second phone is currently in use, and attaches the user inputted message to the CID information if the second phone is not currently in use.

22. The system of claim 11, wherein the CID information includes at least one of a name and a phone number corresponding to the first phone, and the CIDCW information includes a call waiting signal and at least one of the name and phone number corresponding to the first phone.

* * * * *